(12) United States Patent
Donald et al.

(10) Patent No.: US 10,525,996 B1
(45) Date of Patent: Jan. 7, 2020

(54) WHEELBARROW CONVERSION ASSEMBLY

(71) Applicants: Jerry Donald, Grove Hill, AL (US); Barbara Donald, Grove Hill, AL (US)

(72) Inventors: Jerry Donald, Grove Hill, AL (US); Barbara Donald, Grove Hill, AL (US)

( * ) Notice: Subject to any disclaimer, the term of this patent is extended or adjusted under 35 U.S.C. 154(b) by 0 days.

(21) Appl. No.: 16/168,991

(22) Filed: Oct. 24, 2018

(51) Int. Cl.
*B62B 1/18* (2006.01)
*B62B 1/00* (2006.01)
*B62B 1/20* (2006.01)

(52) U.S. Cl.
CPC ............. *B62B 1/002* (2013.01); *B62B 1/20* (2013.01); *B62B 1/186* (2013.01)

(58) Field of Classification Search
CPC .. B62B 1/00; B62B 1/18; B62B 1/186; B62B 1/002; B62B 1/20
See application file for complete search history.

(56) References Cited

U.S. PATENT DOCUMENTS

| | | | |
|---|---|---|---|
| 4,155,678 A * | 5/1979 | Lehman | B60P 3/07 280/402 |
| 5,031,926 A | 7/1991 | Wannamaker | |
| 5,509,681 A * | 4/1996 | Keller | B62B 1/002 280/415.1 |
| 6,220,622 B1 | 4/2001 | Garcia | |
| 6,241,276 B1 | 6/2001 | Wilburn | |
| 6,508,478 B1 | 1/2003 | Ortez | |
| 6,880,852 B2 | 4/2005 | Lim | |
| 7,845,654 B2 * | 12/2010 | Price, Jr. | B62B 1/002 280/47.31 |
| 9,296,404 B1 | 3/2016 | Bell | |
| D778,521 S * | 2/2017 | Bell | D34/16 |
| 2004/0164509 A1* | 8/2004 | Campbell | B62B 1/002 280/47.31 |
| 2005/0212237 A1 | 9/2005 | Lin | |
| 2005/0258007 A1* | 11/2005 | Albert | B62B 1/18 188/2 D |
| 2012/0326407 A1* | 12/2012 | Albert | B62B 1/18 280/47.31 |

* cited by examiner

Primary Examiner — Brian L Swenson

(57) ABSTRACT

A wheelbarrow conversion assembly for facilitating a wheelbarrow to be rolled without lifting the wheelbarrow includes a wheelbarrow that has a bucket and a pair of support legs. A bracket is removably coupled to the wheelbarrow and the bracket is positioned on each of the support legs. A pair of rollers is each of the rollers is rotatably coupled to the bracket to roll along a support surface. Each of the rollers supports weight of the wheelbarrow to facilitate the wheelbarrow to be rolled without lifting the wheelbarrow. In this way the rollers facilitate a physically disabled user to roll the wheelbarrow along the ground.

3 Claims, 3 Drawing Sheets

100 WHEELBARROW CONVERSION ASSEMBLY

CROSS-REFERENCE TO RELATED APPLICATIONS

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to conversion devices and more particularly pertains to a new conversion device for facilitating a wheelbarrow to be rolled without lifting the wheelbarrow.

BRIEF SUMMARY OF THE INVENTION

An embodiment of the disclosure meets the needs presented above by generally comprising a wheelbarrow that has a bucket and a pair of support legs. A bracket is removably coupled to the wheelbarrow and the bracket is positioned on each of the support legs. A pair of rollers is each of the rollers is rotatably coupled to the bracket to roll along a support surface. Each of the rollers supports weight of the wheelbarrow to facilitate the wheelbarrow to be rolled without lifting the wheelbarrow. In this way the rollers facilitate a physically disabled user to roll the wheelbarrow along the ground.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
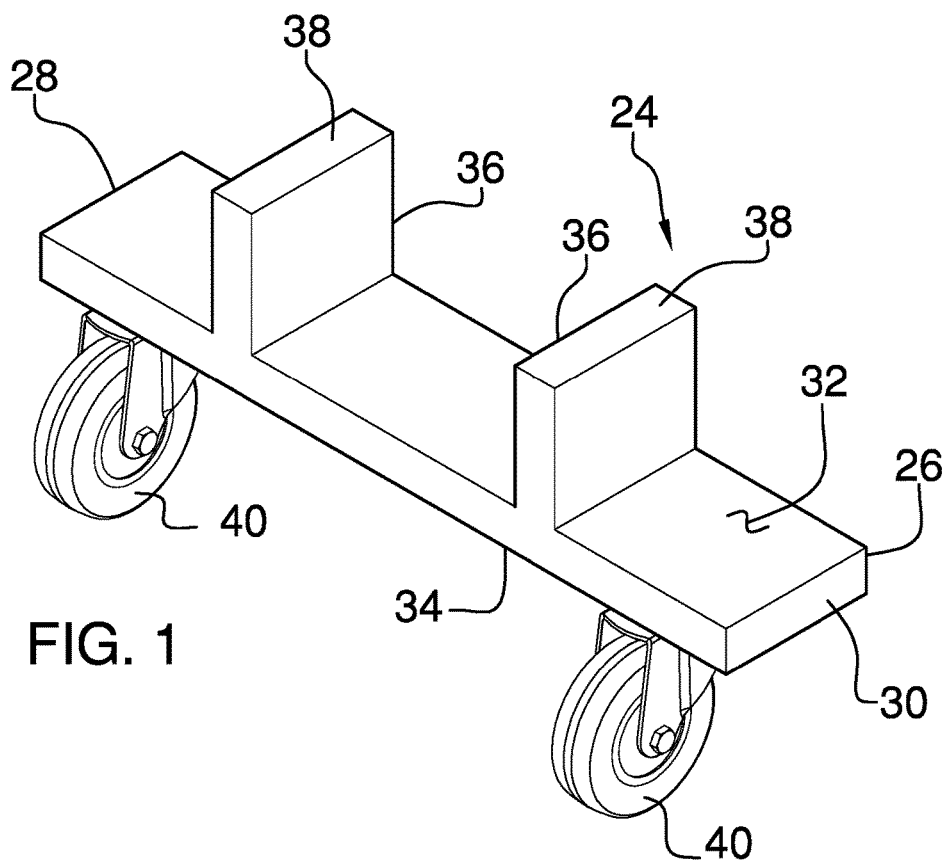
FIG. 1 is a top perspective view of a bracket and rollers of a wheelbarrow conversion assembly according to an embodiment of the disclosure.
Figure 2:
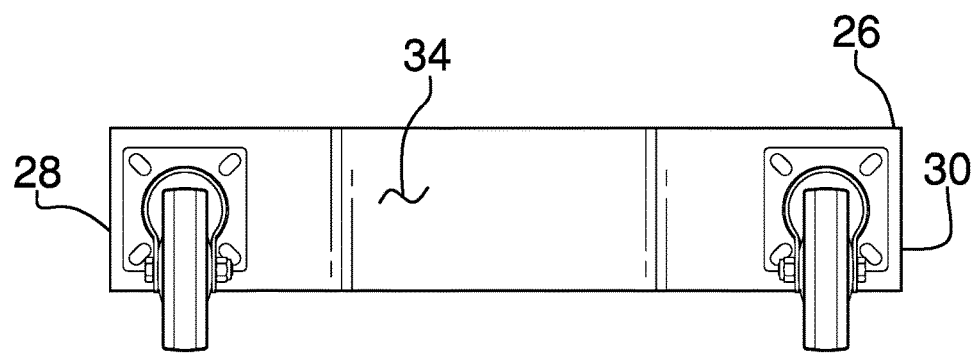
FIG. 2 is a bottom view of a bracket and rollers of an embodiment of the disclosure.
Figure 3:
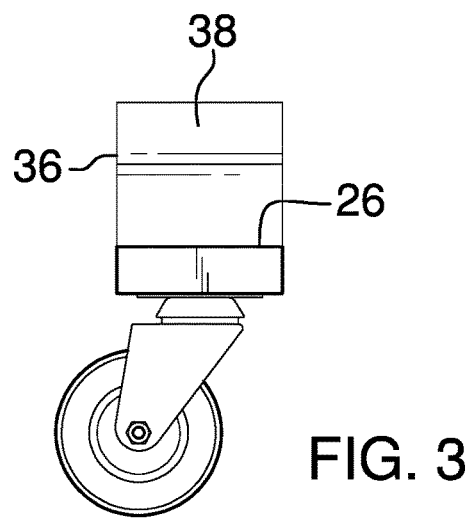
FIG. 3 is a right side view of a bracket and rollers of an embodiment of the disclosure.
Figure 4:
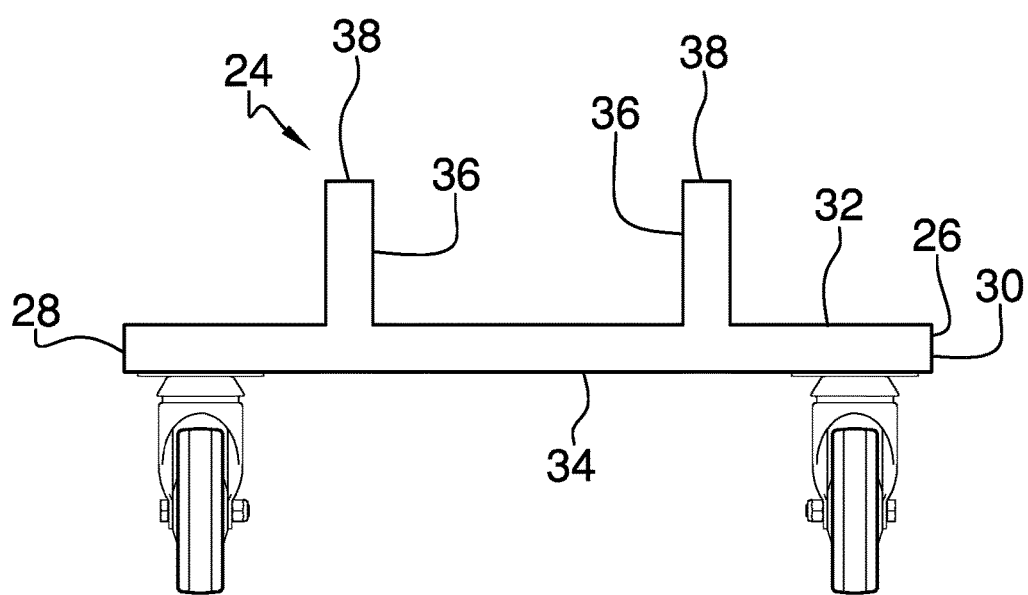
FIG. 4 is a front view of a bracket and rollers of an embodiment of the disclosure.
Figure 5:
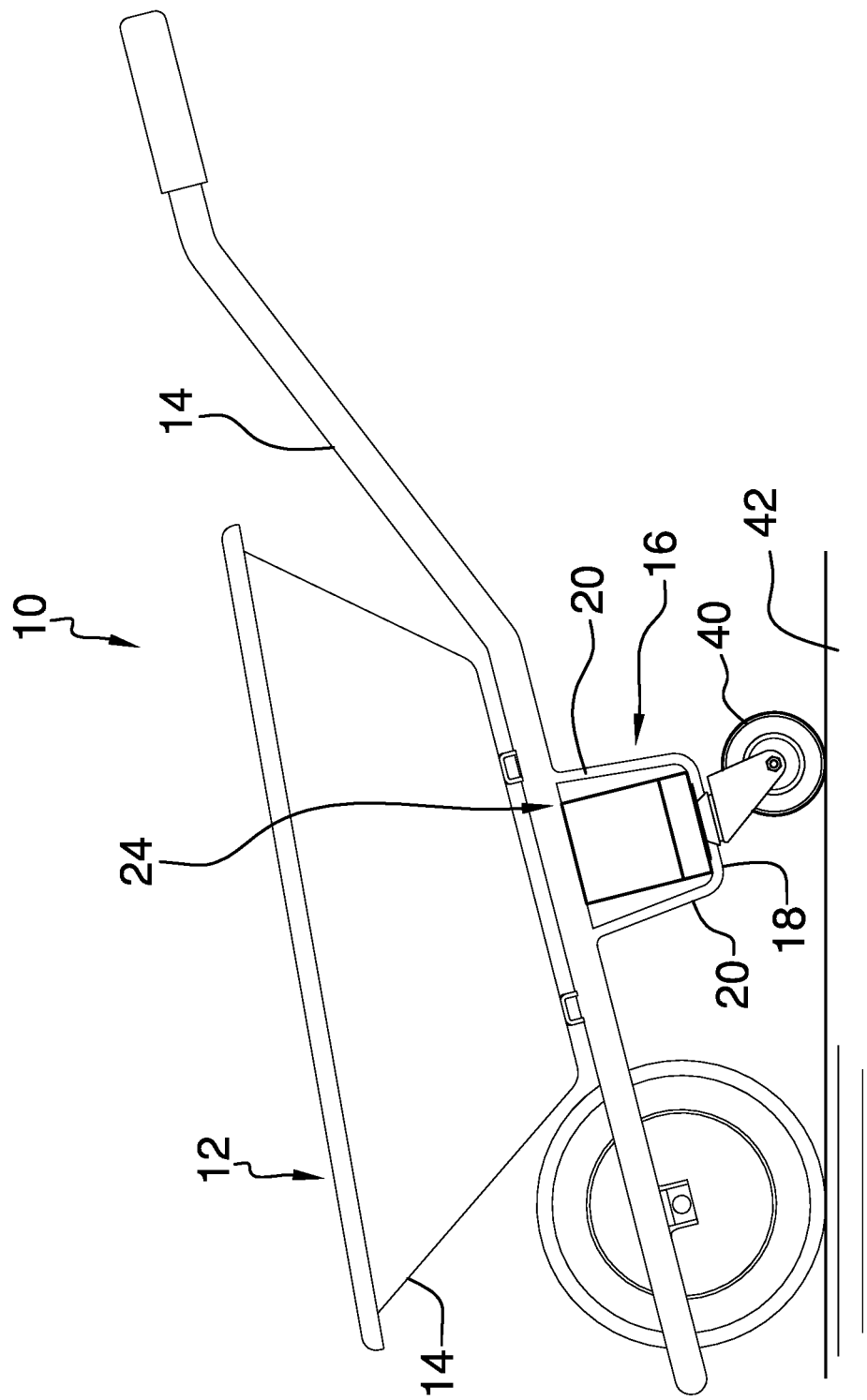
FIG. 5 is a perspective in-use view of an embodiment of the disclosure.

With reference now to the drawings, and in particular to FIGS. 1 through 5 thereof, a new conversion device embodying the principles and concepts of an embodiment of the disclosure and generally designated by the reference numeral 10 will be described.

As best illustrated in FIGS. 1 through 5, the wheelbarrow conversion assembly 10 generally comprises a wheelbarrow 12 that has a pair of handles 14 and a pair of support legs 16. Each of the support legs 16 includes a central member 18 extending between a pair of vertical members 20. The support legs 16 are spaced apart from each other on the wheelbarrow 12. The wheelbarrow 12 may be a wheelbarrow 12 of any conventional design, including single wheel wheelbarrows and double wheel wheelbarrows.

A bracket 24 is provided and the bracket 24 is removably coupled to the wheelbarrow 12. Additionally, the bracket 24 is positioned on each of the support legs 16. The bracket 24 comprises a member 26 that has a first end 28, a second end 30, an upper surface 32 and a lower surface 34, and the member 26 is elongated between the first 28 and second 30 ends. The lower surface 34 rests on the central member 18 of each of the support legs 16 having the member 26 extending outwardly beyond each of the support legs 16.

A pair of uprights 36 is each coupled to and extends upwardly from the upper surface 32 of the member 26. Each of the uprights 36 has a distal end 38 with respect to the member 26. Each of the uprights 36 is spaced from a respective one of the first 28 and second 30 ends of the member 26. Moreover, the distal end 38 of each of the uprights 36 abuts a respective one of the pair of handles 14 when the member 26 is positioned between on the support legs 16. In this way the bracket 24 is restrained between the pair of handles 14 and the central member 18 of each of the support legs 16.

A pair of rollers 40 is provided and each of the rollers 40 is rotatably coupled to the bracket 24 to roll along a support surface 42, such as ground or the like. Each of the rollers 40 supports weight of the wheelbarrow 12 to facilitate the wheelbarrow 12 to be rolled without lifting handles on the wheelbarrow 12. In this way the rollers 40 facilitate a physically disabled user to roll the wheelbarrow 12 along the ground without having to lift the wheelbarrow 12. Each of the rollers 40 is positioned on the lower surface 34 of the member 26 and each of the rollers 40 is aligned with a respective one of the first 28 and second 30 ends of the member 26. Each of the rollers 40 is spaced outwardly from a respective one of the support legs 16 when the member 26 is positioned on the support legs 16. In this way the rollers 40 inhibit lateral motion of the member 26 when the wheelbarrow 12 is rolled.

In use, the member 26 is slid between the vertical members 20 of each of the support legs 16 until each of the rollers 40 is spaced outwardly each of the support legs 16. Thus, distal end 38 of each of the uprights 36 abuts the respective handle 14 thereby facilitating each of the rollers 40 to roll on the ground. In this way the wheelbarrow 12 can be rolled along the ground without requiring the handles 14 on the wheelbarrow 12 to be lifted in the conventional manner of moving a wheelbarrow 12. Thus, a physically disabled user can transport a load in the wheelbarrow 12 without having to lift the handles 14. The bracket 24 is removable from the wheelbarrow 12 at any time thereby facilitating the wheelbarrow 12 to be used in the conventional manner.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A wheelbarrow conversion assembly being configured to facilitate rear wheels on a wheelbarrow, said assembly comprising:
   a wheelbarrow having a pair of support legs and a pair of handles;
   a bracket being removably coupled to said wheelbarrow, said bracket being positioned on each of said support legs;
   a pair of rollers, each of said rollers being rotatably coupled to said bracket wherein each of said rollers is configured to roll along a support surface, each of said rollers supporting weight of said wheelbarrow to facilitate said wheelbarrow to be rolled without lifting said wheelbarrow wherein said rollers are configured to facilitate a physically disabled user to roll said wheelbarrow along the ground;
   each of said support legs including a central member extending between a pair of vertical members, said support legs being spaced apart from each other on said wheelbarrow; and
   said bracket comprising a member having a first end, a second end, an upper surface and a lower surface, said member being elongated between said first and second ends, said lower surface resting on said central member of each of said support legs having said member extending outwardly beyond each of said support legs.

2. The assembly according to claim 1, wherein:
   said bracket includes a pair of uprights, each of said uprights being coupled to and extending upwardly from said upper surface of said member, each of said uprights having a distal end with respect to said member, each of said uprights being spaced from a respective one of said first and second ends of said member; and
   said distal end of each of said uprights abuts a respective one of said handles when said member is positioned between said support legs such that said bracket is restrained between said handles and said central member of each of said support legs.

3. A wheelbarrow conversion assembly being configured to facilitate rear wheels on a wheelbarrow, said assembly comprising:
   a wheelbarrow having a pair of support legs and a pair of handles, each of said support legs including a central member extending between a pair of vertical members, said support legs being spaced apart from each other on said wheelbarrow, said bucket having a bottom surface;
   a bracket being removably coupled to said wheelbarrow, said bracket being positioned on each of said support legs, said bracket comprising:
     a member having a first end, a second end, an upper surface and a lower surface, said member being elongated between said first and second ends, said lower surface resting on said central member of each of said support legs having said member extending outwardly beyond each of said support legs; and
     a pair of uprights, each of said uprights being coupled to and extending upwardly from said upper surface of said member, each of said uprights having a distal end with respect to said member, each of said uprights being spaced from a respective one of said first and second ends of said member, said distal end of each of said uprights abutting a respective one of said handles when said member is positioned between said support legs such that said bracket is restrained between said handles and said central member of each of said support legs; and
   a pair of rollers, each of said rollers being rotatably coupled to said bracket wherein each of said rollers is configured to roll along a support surface, each of said rollers supporting weight of said wheelbarrow to facilitate said wheelbarrow to be rolled without lifting said wheelbarrow wherein said rollers are configured to facilitate a physically disabled user to roll said wheelbarrow along the ground, each of said rollers being positioned on said lower surface of said member, each of said rollers being aligned with a respective one of said first and second ends of said member, each of said rollers being spaced outwardly from a respective one of said support legs when said member is positioned on said support legs thereby inhibiting lateral motion of said member when said wheelbarrow is rolled.

\* \* \* \* \*